April 22, 1952 — M. A. SWEAT — 2,593,935
COTTER PIN PULLER
Filed June 27, 1949
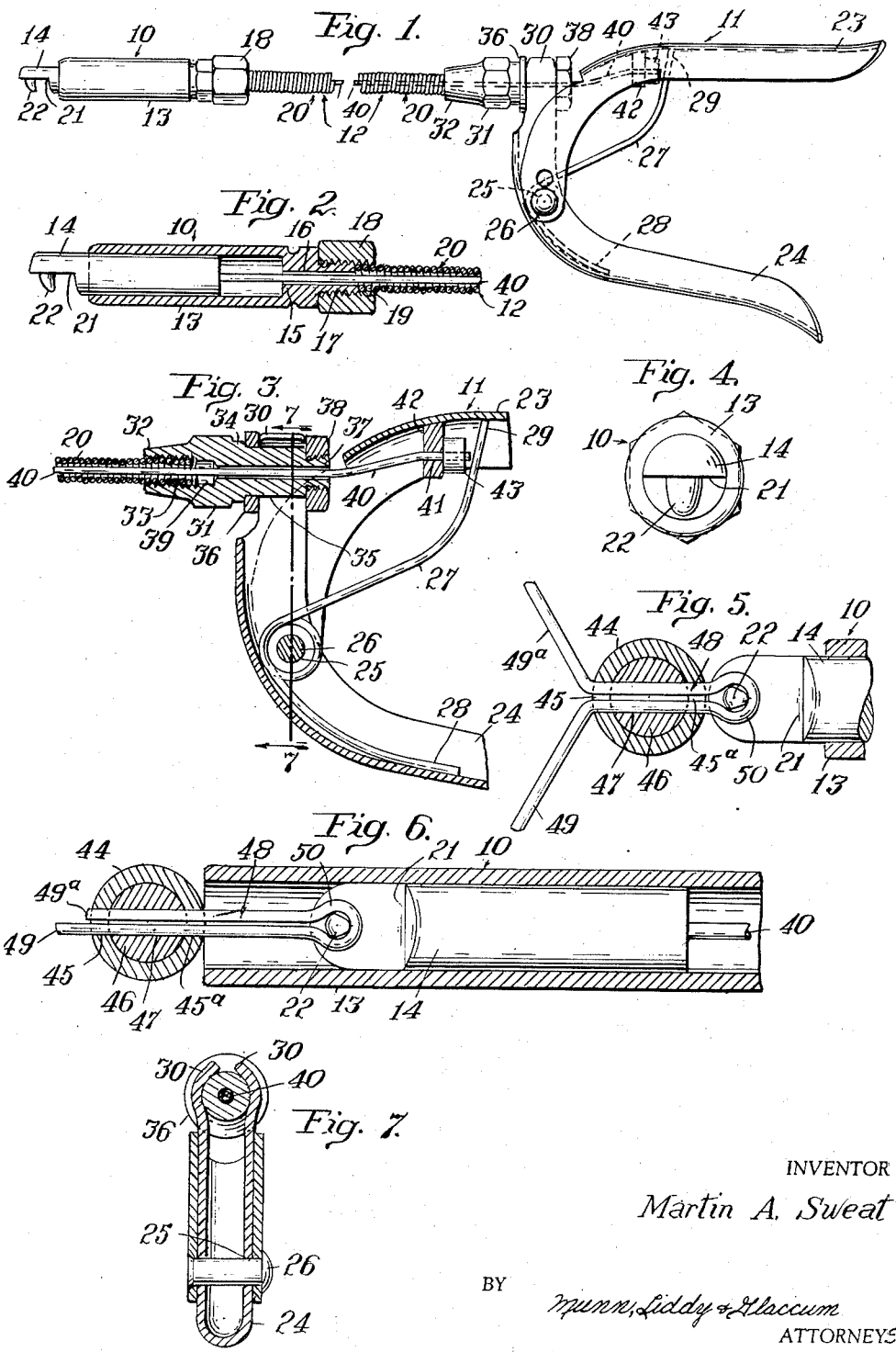
INVENTOR
Martin A. Sweat
BY
Munn, Liddy & Maccum
ATTORNEYS Patented Apr. 22, 1952

2,593,935

UNITED STATES PATENT OFFICE 2,593,935

COTTER PIN PULLER

Martin A. Sweat, Waycross, Ga.

Application June 27, 1949, Serial No. 101,531

2 Claims. (Cl. 29—247)

This invention relates to cotter pin removers and more particularly to the type provided with a slidably mounted bolt, a hook on a free end portion of said bolt adapted to engage the eye of a cotter pin, and actuating means for reciprocating said bolt and removing said pin from its securing position.

A particular object of this invention is the provision of a cotter pin remover which is adapted to be used in confined spaces where it is difficult to use a conventional pin removing means.

This invention has as a further object the provision of a reciprocating bolt which is swivelly mounted with respect to the means for reciprocating said bolt thereby allowing the bolt to rotate to any position to hook the cotter pin eye.

Still another object of the present invention is the provision of a flexible cable and housing therefor connecting the bolt and its actuating means.

A still further object of the invention is the provision of a cotter pin remover which may also be used as a means for placing a new cotter pin in position without dropping said pin before it is in position.

Still other objects and advantages will become apparent from the following description of the present invention illustrated in the accompanying drawing in which:

Figure 1 is a fragmentary elevation of the present invention;

Figure 2 is a sectional view of the reciprocating bolt, its housing and connection to the flexible cable;

Figure 3 is a sectional view of the bolt actuating means and its connection to the other end of the flexible cable;

Figure 4 is an end view of the invention as shown in Fig. 2;

Figure 5 is a bottom view of the bolt hook shown engaging the eye of a cotter pin which is secured in position;

Figure 6 is a view similar to Fig. 5 showing the cotter pin withdrawn from its securing position;

Figure 7 is a sectional view taken on line 7—7 of Fig. 3.

The present cotter pin remover consists of three general parts, (1) a reciprocating bolt and its sleeve-like housing, generally designated as 10, (2) an actuating means for reciprocating said bolt, generally designated as 11, and (3) a flexible cable and its housing connecting said bolt and its actuating means.

As best seen in Fig. 2, the bolt and housing assembly 10 comprises an elongated sleeve 13 having a bolt 14 slidably and rotatably mounted therein. One end of sleeve 13 is closed by means of a wall 15, this end wall having an axial opening centrally arranged therein. The outer periphery of said wall is hexagonally shaped in order that a means will be provided for securing a wrench thereto to facilitate removal of the sleeve from the assembly. Adjacent the end wall and extending in a direction opposite to the sleeve is provided a threaded portion 17 of a diameter less than that of sleeve 13. Threadingly connected therewith is a nut 18. It will be apparent from Fig. 2 that the threaded portion 17 of the sleeve is of a length less than that of nut 18 thereby furnishing a space 19 adapted to receive one end of a flexible cable housing 20 which may be threadingly received by said nut 18 or may be soldered therein.

The free end of the bolt 14 is provided at the lower portion thereof with a recess 21. Downwardly projecting from said recess and of a length equal to approximately one-half the diameter of the bolt is a round hook-like fixture 22. It is this fixture which is adapted to be placed in the eye of the cotter pin.

The actuating means 11, as will be seen in Figs. 1, 3 and 7, comprises a grip consisting of upper and lower handles 23 and 24, respectively. Both of these handles are arcuate in shape and semi-circular in cross section. The upper handle 23 is bifurcated at one end thereof and is provided with apertures 25, which are adapted to receive a bolt or rivet 26 therethrough. Intermediate the ends of the lower handle 24 apertures are provided which are also adapted to receive therethrough the bolt or rivet means 26. Therefore, to assemble the handles the bifurcated end portion of the upper handle 23 is placed intermediate the ends of the lower handle 24, said apertures in both handles being in alignment. The rivet or bolt means 26 is then placed through the aligned openings and secured therein. In order to prevent the handle means 23 and 24 from collapsing together a spring 27 is wound intermediate its ends around the rivet means 26 and has one end lying against the inner surface of lower handle 24 and has another end 29 adapted to lie against the inner surface of the upper handle 23. It will therefore be seen that if the handles 23 and 24 are pressed together the spring 27 will force them apart when the applying force is released.

The means of securing the lower handle 24 to the assembly comprises the forming of a bifurcated end portion 30 on said handle means adjacent the rivet 26. Adapted to be secured between these bifurcated end portions is a bolt means 31. One end of the bolt means 31 is tapered forming the surface 32. The inner portion of this tapered surface 32 forms a socket 33 which is adapted to receive the other end of cable housing 20 therein. Any convenient means may be used to secure said cable in the socket. The other end portion of the bolt means 31 is provided with step-like reduced portions 34, 35 and 37 respectively, said portion 37 being externally threaded. A washer 36 is adapted to be placed on the reduced portion 35 to abut the outer end of portion 34. To assemble the lower handle means 24 to the bolt means 31 the bifurcated end portion 30 is placed around the reduced portion 35 to abut the washer 36. A nut 38 is then secured to the threaded reduced portion 37 until it abuts the other side of the bifurcated end 30 of the handle means 24. By tightening the nut 38 the handle will be fixedly secured thereto. Centrally of the bolt means 31 an axial opening 39 is provided to receive a flexible cable 40. Also as shown in Fig. 2 the flexible cable 40 extends through the axial opening 16 in the sleeve wall 15. One end of the flexible cable 40 is adapted to be connected to the bolt 14 and the other end thereof is adapted to extend through an aperture 41 in a downwardly projecting lug 42 mounted on the inner surface of the upper handle 23. A circular stop plate 43 is secured to the end of the cable after it has been placed through apertures 41 and is adapted to abut lug 42.

The operation of the device is simple. By way of illustration Figs. 5 and 6 show a cotter pin mounted in a machine part. In this instance the machine part comprises a sleeve 44 having a pair of aligned apertures 45 and 45ᵃ on opposite sides thereof. A shaft 46 having an aperture 47 is slidably received in said sleeve, said apertures 45, 45ᵃ and 47 all being in alignment. To prevent relative movement between sleeve 44 and shaft 46 a cotter pin 48 is inserted in the aligned apertures. One end of the cotter pin comprises an eye 50 and the other end is formed into a pair of legs 49 and 49ᵃ. When the eye 50 is adjacent the sleeve 44 the legs 49 and 49ᵃ are spread apart thereby securing the pin in position. To remove the cotter pin it is but necessary to insert the hook-like projection 22 on bolt 14 in the cotter pin eye 50. Handles 23 and 24 are then pressed together causing the bolt 14 to be pulled inwardly into sleeve 13. When the outer end of sleeve 13 engages the outer periphery of sleeve 44 and handles 23 and 24 are pressed still closer together, the hook is pulled further into sleeve 13 and the cotter pin ends 49 and 49ᵃ are pulled into near parallel alignment, as shown in Fig. 6, and the cotter pin is withdrawn from the apertures and held in sleeve 13.

It is to be noted that the lower end of the downwardly extending hook 22 on bolt 14 is of a length sufficient to ride against the inner surface of sleeve 13. Thus, when the hook 22 engages the eye of the cotter pin and has removed same into sleeve 13 the cotter pin cannot be removed from the hook until the hook and bolt are allowed to extend outwardly beyond the free end of sleeve 13. This is very important since in working around electric motors and other intricate machinery it is desirable not to lose or drop any parts into the machine.

It will be seen from the operation and the description of this cotter pin remover that cotter pins in out of the way places can easily be reached. That is, when there is not a straight line through the parts of the machinery to the cotter pin, the flexible cable and cable housing allows the bolt and its associated hook to be curved relative to the actuating means without impairing the efficiency thereof. Many important uses may be attained by means of this flexible cable.

Another use to which this cotter pin remover may be put is that of working around hot motors, exhaust pipes and hot water pipes. In the ordinary type of cotter pin remover it would be necessary to wait until each of these articles becomes cool before working thereon. However, with the present device the handle actuating means may be kept at some distance from the heat while the bolt may be placed near these articles to remove any necessary cotter pins. This results in quite a saving of time.

Also important from a practical standpoint is the fact that the bolt 14 is not only slidably mounted in sleeve 13, but will also rotate therein. This is brought about from the fact that cable 40 is swivelly received in the aperture 41 of lug 42. Thus, when the eye of a cotter pin extends in a direction other than vertical it is but necessary to rotate the bolt until it is in alignment with the eye. Handles 23 and 24 may remain in their normal position. This is in contrast to the ordinary type of cotter pin remover where the handles must be rotated until the bolt hook is in alinement with the eye of the cotter pin.

While a preferred form of the invention has been shown and described it will be understood that modifications in details of form may be made without departure from the invention as defined in the appended claims.

I claim:

1. A cotter pin remover comprising a sleeve having a bolt slidably received therein, means actuating said bolt, said means including a lower handle means having one end thereof bifurcated, bolt means connected to said one end having an opening therethrough, a flexible cable housing connecting said sleeve and said bifurcated end portion, an upper handle means having a bifurcated end portion partially connected to the lower handle intermediate the ends of said lower handle, a lug mounted on said upper handle having an aperture therein, a flexible cable extending through said housing connected at one of its ends to said bolt, the other end of said cable extending through the bifurcated portions of said handle, through said opening, through said lug aperture, and being swivelly connected to said lug, said aperture and said opening being in substantial alignment.

2. A cotter pin remover comprising an elongated sleeve having a bolt slidably received therein, a flexible housing connected at one of its ends to said sleeve, actuating means for reciprocating said bolt connected to the other end of said flexible housing including a lower handle, an upper handle connected at one of its ends intermediate the ends of said lower handle, spring means normally holding the free ends of said handles in spaced apart relation, a lug projecting downwardly from said upper handle and having an aperture therein, a flexible cable slidably received by said housing and connected at one of its ends to said bolt, the other end of said cable being freely received within said aperture and extending therethrough, a stop plate mounted on the said other end of said cable, bolt means mounted on said lower handle having an opening therethrough, said cable extending through said opening, said opening being substantially in axial alignment with said aperture.

MARTIN A. SWEAT.

REFERENCES CITED

The following references are of record in the file of this patent:

UNITED STATES PATENTS

| Number | Name | Date |
|---|---|---|
| 1,493,821 | Moyer | May 13, 1924 |
| 1,563,840 | Dirks | Dec. 1, 1925 |
| 1,610,969 | Robertson | Dec. 14, 1926 |
| 1,707,842 | Buckle | Apr. 2, 1929 |

FOREIGN PATENTS

| Number | Country | Date |
|---|---|---|
| 163,168 | Great Britain | May 19, 1921 |
| 690,768 | Germany | May 7, 1940 |